United States Patent
Kim et al.

(10) Patent No.: US 7,653,375 B2
(45) Date of Patent: *Jan. 26, 2010

(54) MOBILE TELEPHONE NETWORK-BASED SYSTEM FOR DETECTION AND LOCATION OF HAZARDOUS AGENTS

(76) Inventors: Jeong Kim, 9724 Sorrel Ave., Potomac, MD (US) 20854; Yung-Lung Ho, 9300 Wildoak Dr., Bethesda, MD (US) 20814

(*) Notice: Subject to any disclaimer, the term of this patent is extended or adjusted under 35 U.S.C. 154(b) by 0 days.

This patent is subject to a terminal disclaimer.

(21) Appl. No.: 11/743,469

(22) Filed: May 2, 2007

(65) Prior Publication Data

US 2007/0232296 A1 Oct. 4, 2007

Related U.S. Application Data

(63) Continuation of application No. 10/961,474, filed on Oct. 8, 2004, now Pat. No. 7,221,934.

(51) Int. Cl.
*H04Q 7/24* (2006.01)
(52) U.S. Cl. .................. 455/404.1; 455/521
(58) Field of Classification Search ......... 455/426.1, 455/412.1, 566, 550.1; 702/188; 422/83; 340/521, 539.1, 517; 604/890.1; 356/28.5
See application file for complete search history.

(56) References Cited

U.S. PATENT DOCUMENTS

| | | | |
|---|---|---|---|
| 6,578,416 B1 | 6/2003 | Vogel et al. | |
| 2003/0154044 A1 | 8/2003 | Lundstedt et al. | |
| 2003/0194350 A1* | 10/2003 | Stamatelos et al. | 422/83 |
| 2003/0234725 A1* | 12/2003 | Lemelson et al. | 340/521 |
| 2004/0189976 A1* | 9/2004 | Burns et al. | 356/28.5 |
| 2004/0204915 A1* | 10/2004 | Steinthal et al. | 702/188 |
| 2005/0085257 A1 | 4/2005 | Laird et al. | |
| 2005/0181791 A1 | 8/2005 | Mielke et al. | |
| 2005/0206506 A1 | 9/2005 | Kulesz et al. | |
| 2005/0264412 A1* | 12/2005 | Levesque et al. | 340/517 |
| 2008/0065050 A1* | 3/2008 | Sparks et al. | 604/890.1 |

* cited by examiner

*Primary Examiner*—Nick Corsaro
*Assistant Examiner*—Michael T Vu
(74) *Attorney, Agent, or Firm*—Aka Chan LLP

(57) ABSTRACT

A system for detecting hazardous agents is based on cellular telephone networks. The cellular telephones in public circulation have at least one detector for detecting at least one hazardous agent and broadcast alarm packets upon detecting the hazardous agent. A computer or computer network interconnected with telephones by the cellular telephone network processes the alarm packets and sets an alarm condition for the hazardous agent in a vicinity of the cellular telephone by calculations based upon alarm packets from other telephones with detectors for the hazardous agent in the vicinity. A map of the contaminated area is also created.

19 Claims, 5 Drawing Sheets

MOBILE TELEPHONE NETWORK-BASED SYSTEM FOR DETECTION AND LOCATION OF HAZARDOUS AGENTS

CROSS-REFERENCE TO RELATED APPLICATIONS

The present application is a continuation of U.S. application Ser. No. 10/961,474 filed Oct. 8, 2004, the contents of which are incorporated by reference herein in their entirety for all purposes.

BACKGROUND OF THE INVENTION

The present invention is related to electronic systems for the detection and location of hazardous agents and, more particularly, to such systems based upon mobile telephone networks.

Sources of hazardous agents, such as biological, chemical, and radioactive materials, are plentiful in modern society and the possibilities of their release must be faced. Furthermore, given the present threat of terrorism, the dangers of the purposeful release of these agents is also a real possibility. Hence there is the need for a network of ubiquitous detectors which are capable of sensing such biological, chemical, and radioactive agents.

Various networks, detectors and combinations of networks and detectors have been proposed in response. One proposal has been the deployment of such detectors in simple combination with, or as an integral part of, cellular (or cell) telephones. Cell telephones are ubiquitous in modern societies and are transported everywhere. As normally used telephones, the telephone owners are likely to keep the telephones charged and in good working order. Canadian Patent No. 2,418,612, which issued to Marian Gavrila and Gabriel Patulea, describes the incorporation of chemical, radiation, and biological agent detectors in cell phones and U.S. Pat. No. 6,697,645, which issued to J. M. MacFarlane, discloses the incorporation of environmental sensors into cellular phones.

Efforts at numerous national laboratories, universities, and businesses have focused mostly on sensor development. For example, Lawrence Livermore National Laboratory is currently developing radiation detectors which can be embedded in PDA (Personal Digital Assistant)/cell telephone devices which are part of a wireless network known as RadNet. These devices are to be deployed with specially trained personnel, such as firefighters, utility workers, police, and custom agents, as a first response team. But the relatively low number of such people compared to the general population means that the detectors, or sensors, must necessarily be highly sensitive and accurate. These requirements imply that deployment of such a network system is likely to be many years away. Other efforts include research on wireless networks of autonomous sensor devices; e.g., Graviton Corp. of San Diego is developing a network independent of existing cell telephone infrastructures.

Despite these efforts, these network systems suffer from various deficiencies, such as lack of geographical coverage, and high costs of installation and maintenance. The distribution of detectors/cell telephones to special personnel limits the distribution of the sensor network. Sensitive and accurate detectors raise the initial and maintenance costs of the sensor/PDA/cell telephone (or autonomous sensor) devices and the installation of special wireless networks further adds the total of network system costs.

On the other hand, the present invention provides for a network system which is inexpensive to operate with easy installation and low maintenance costs.

BRIEF SUMMARY OF THE INVENTION

The present invention provides for a cellular telephone network-based system for detecting hazardous agents. The cellular telephone network is capable of physically locating cellular telephones in the network and the system has cellular telephones in public circulation with each cellular telephone having at least one detector for detecting at least one hazardous agent and broadcasting over the cellular telephone network at least one alarm packet upon detecting the hazardous agent. The system also has at least one computer interconnected with telephones by the cellular telephone network for processing the alarm packet and setting an alarm condition for the hazardous agent in a vicinity of the cellular telephone by calculations based upon alarm packets from other telephones with detectors for the hazardous agent in the vicinity. The calculations include determination of a level of contamination of the hazardous agent in the vicinity and integration over the level of contamination of the hazardous agent over the vicinity to determine whether a result of integration exceeds an alarm threshold. The calculations also include adjusting for the number of telephones broadcasting alarm packets for the hazardous agent in the vicinity with respect to the total number of telephones capable of detecting the hazardous agent in the vicinity.

The present invention also provides for a method of operation in a system based on a cellular telephone network having a plurality of cellular telephones in public circulation, each cellular telephone capable of detecting one or more hazardous agents and being located by the cellular telephone network. The method has the steps of: receiving an alarm packet from any of the cellular telephones responsive to detection of a hazardous agent, the alarm packet including data identifying the hazardous agent and a cellular telephone base station in communication with the telephone; determining a level of contamination of the hazardous agent in the vicinity; integrating the level of contamination over the vicinity; and determining whether a resulting integration value exceeds a threshold to determine whether an alarm condition for the hazardous agent in the vicinity exists. The method also has the step of adjusting the level of contamination for the number of telephones broadcasting alarm packets for the hazardous agent in the vicinity with respect to the total number of telephones capable of detecting the hazardous agent in the vicinity.

DETAILED DESCRIPTION OF THE INVENTION

The present invention provides for a cellular, or cell, telephone network-based system using sensitive but less accurate detectors (or sensors) deployed broadly amongst the general cell telephone-carrying public. The network system can function as a first tier in a multi-tiered network for raising an alarm and eliciting an initial response against hazardous agents which have been released into the public environment. The system can produce a digital map of an agent-contaminated area and identify the most likely point of agent release. This allows a better directed secondary response to investigate a possible attack. The same map can be used to track and predict the probable spread of the contaminants. Given the uncontrolled environment in which cell telephones operate, the present invention creates the contamination map without depending on perfectly functioning cell telephones and readily accommodates increasingly capable sensors as consumers acquire newer telephones.

Figure 1:
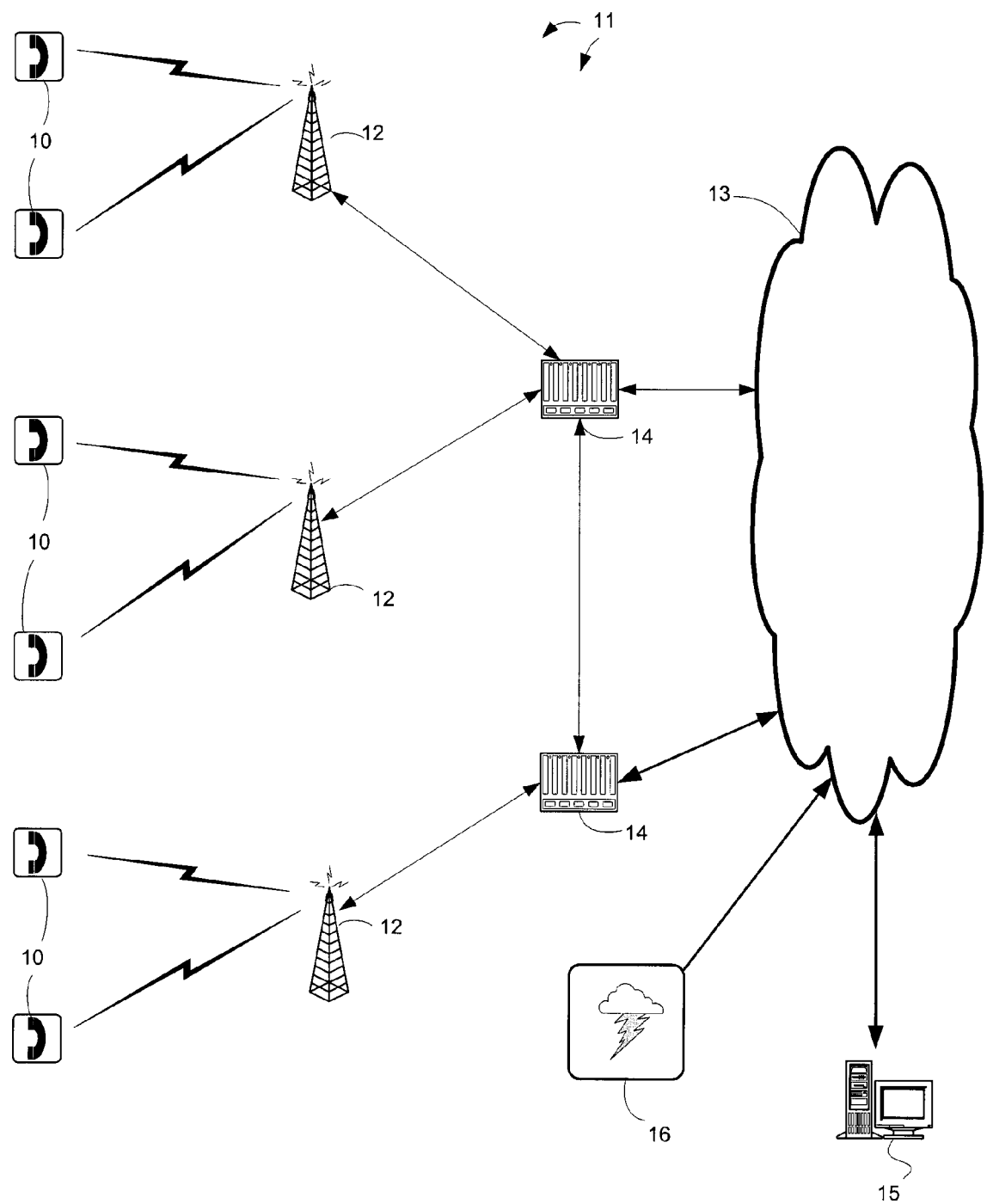
FIG. 1 is a representation of a mobile telephone network-based system according to one embodiment of the present invention.

The system of the present invention operates with the following general components as illustrated by the representational drawing of FIG. 1: consumer cell telephones 10; services which can locate any cellular telephone 10, such as provided by the cellular telephone base stations 12 of a cellular network 11 operating under enhanced 911 (E911) requirements; local wind velocity data, such as collected or calculated by weather services 16; and one or more computers 15 connected to the cellular telephone network and operating as described below.

The cell telephones 10 which are part of the system are ordinary cellular telephones circulating in public and using the existing cellular network infrastructure. But other wireless network devices, such as 802.16 terminals, wireless LAN and BlueTooth transceivers, are possible where in common use and where the locations of the devices can be determined through the network. Hence the term, cellular or cell telephones, is used to include devices which are in widespread public use, locatable, and interconnected by wireless communication networks.

Each telephone (or device) 10 is equipped with one or more detectors capable of sensing one or more hazardous agents, including biological, chemical, or radioactive materials. In the sales of these telephones to the public, the telephones 10 are distributed so that the telephones in a given cell area have the sensing capabilities of the full spectrum of likely hazardous agents. Statistical means are used to ensure a high probability that each cell area has the full agent detection coverage.

The telephones 10 operate automatically in accordance with the present invention. Upon detection of a dangerous agent by a detector, enhanced firmware in the telephone 10 holding the detector broadcasts alarm data packets over the cellular network 11 to indicate a danger or threat. The location of any telephone 10 in communication with the cellular telephone network 11 is capable of being determined by the base stations 12 of the network 11 operating under E911 standards. E911, or enhanced 911, is a set of requirements by the U.S. Federal Communications Commission, which imposes the capability of locating a cellular telephone within a certain resolution distance. The distance is currently 100 m, though this resolution distance may be upgraded over time. The present invention uses the capability of the E911 location service to rapidly locate a large number of cell telephones in a typical cell-sized region.

The present invention also uses wind velocity data at sufficiently distributed and large number of locations so as to provide wind speed and direction information with sufficient resolution down to the size of a typical telephone cell. Other meteorological data which might affect agent propagation, e.g., precipitation, may also be collected for further refinement of the contamination tracking process. Sites from weather services 16 may provide the data. Alternatively or concurrently with weather service data, data from meteorological instruments located at the cell base stations 12 may be used where the potential for attack is high and/or the terrain is complicated. For open areas, weather service data which has resolution measured in hundreds of meters is sufficient.

Finally, the present invention uses one or more computers 15 which are connected to the cell telephones through the cellular network 11. As represented in FIG. 1, the cellular network 11 includes cellular base stations 12 which are interconnected by mobile transport serving offices 14 to each other and to the ordinary public switched telephone network (PSTN). Through the PSTN the telephones 10 are connected to the Internet which, together with the PSTN, is represented by a cloud 13 in FIG. 1. Only one computer 15 is shown in FIG. 1 but it is should be understood as representing a plurality of computers 15 connected to the telephones 10 through the Internet, the PSTN and the cellular network 11. Preferably the computers themselves are interconnected by a network. The computers 15 initiate the E911 locator service, collect wind data, and create the digital contamination map, among other functions, as described in greater detail below.

Figure 2:
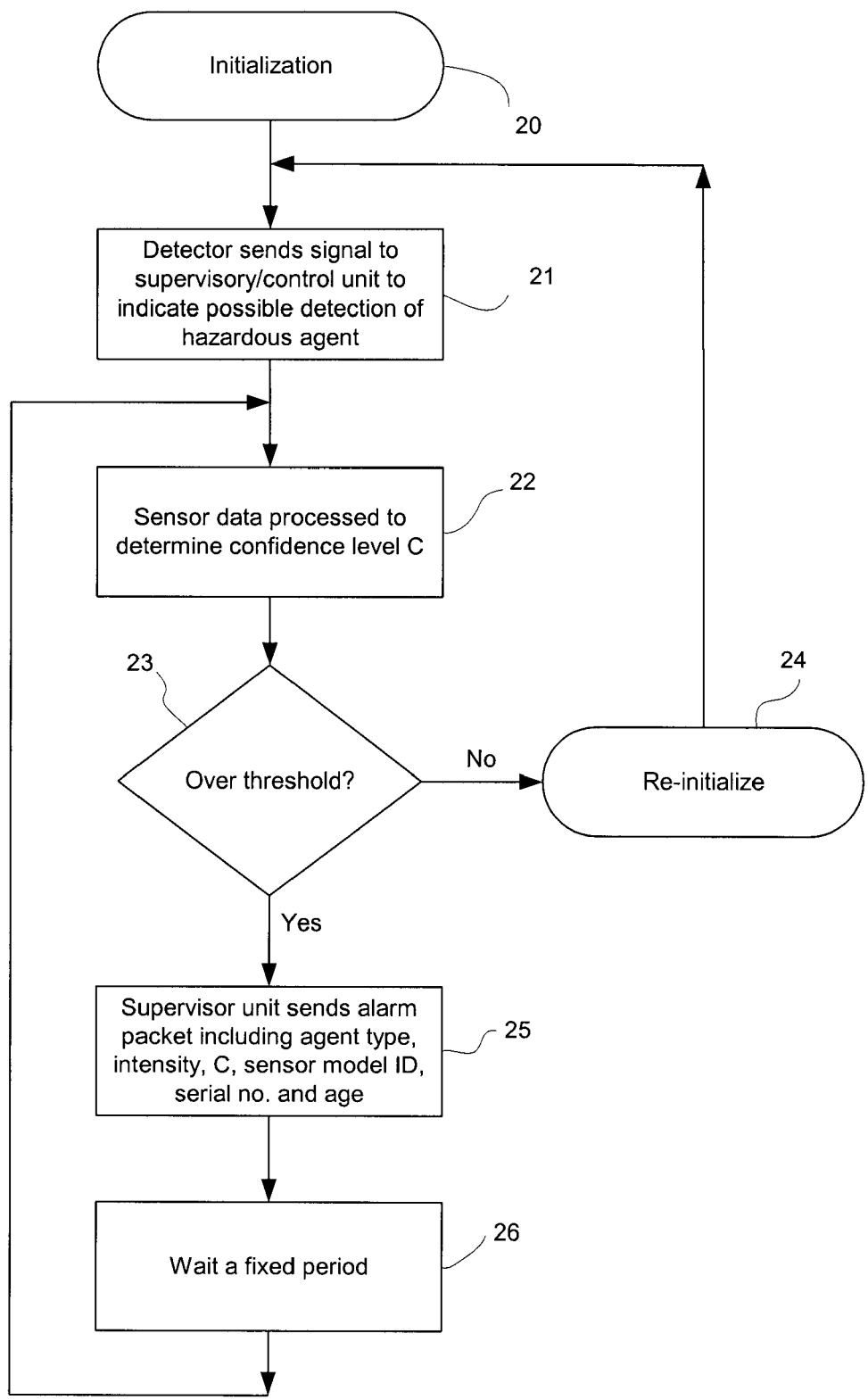
FIG. 2 is a flow chart of operations of a cell telephone upon the detection of a hazardous agent, according to one embodiment of the present invention.

The detection of a hazardous agent by a detector in a telephone 10 starts telephone operations after the initialization step 20, as illustrated by the flow chart of in FIG. 2. While one alternative is to shut down all functions when the telephone is turned off, it is preferable that the detector remains on whether or not the telephone has been turned off or not. Upon detecting the agent, the detector sends a signal to the supervisory/control unit of the telephone, as shown in step 21. If the telephone had been turned off, the supervisory/control unit "awakens." Under step 22, an onboard processor is then engaged to determine a confidence level C, i.e., how closely does the detector response matches known agent signature patterns that a hazardous agent has been detected. The confidence level C is checked against a threshold value in decision step 23. If C does not exceed the threshold value, the telephone 10 is re-initialized by step 24 and is returned to the "waiting" state after the initialization step 20.

If the confidence level C exceeds the threshold value, the supervisory/control unit under its enhanced firmware causes one or more alarm packets to be sent across the wireless network 11 to indicate the detection of a hazardous agent under step 25. The alarm packets include data on the agent type, the intensity I of the detector's response to the agent; the confidence level C, the model number of the detector; its particular serial number; and the detector's age. After waiting a fixed period under step 26, the telephone 10 loops back to the state preceding step 22 for another determination of the confidence level C. The alarm packets sent by step 25 trigger operations at the receiving cellular telephone base station 12 to send the base station's identification number, along with the alarm packets to the computer 15 through the cellular network 11.

Figure 3:
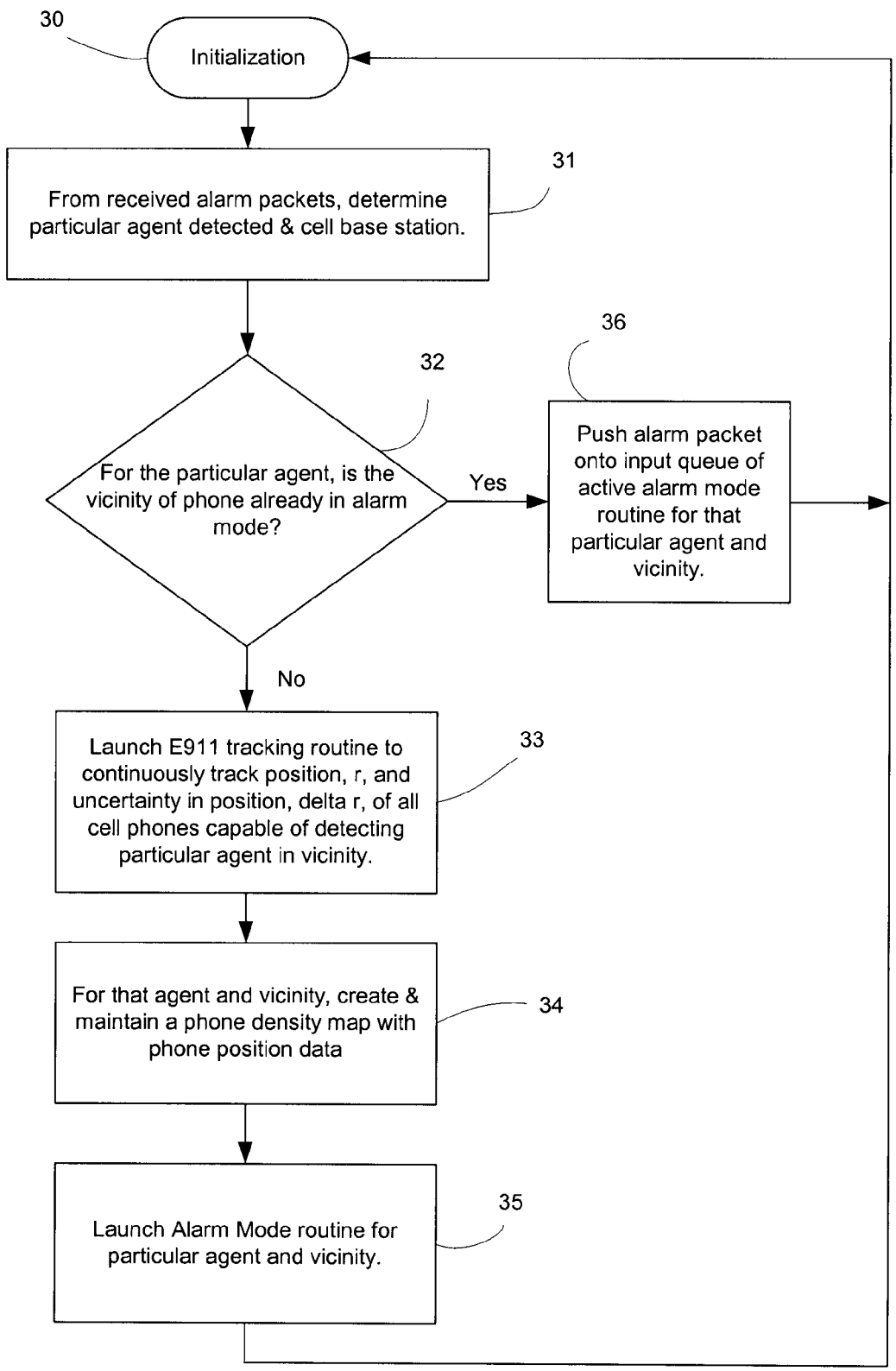
FIG. 3 is a flow chart of computer operations upon receipt of alarm packets from a cell telephone, according to one embodiment of the present invention.
Figure 4A:
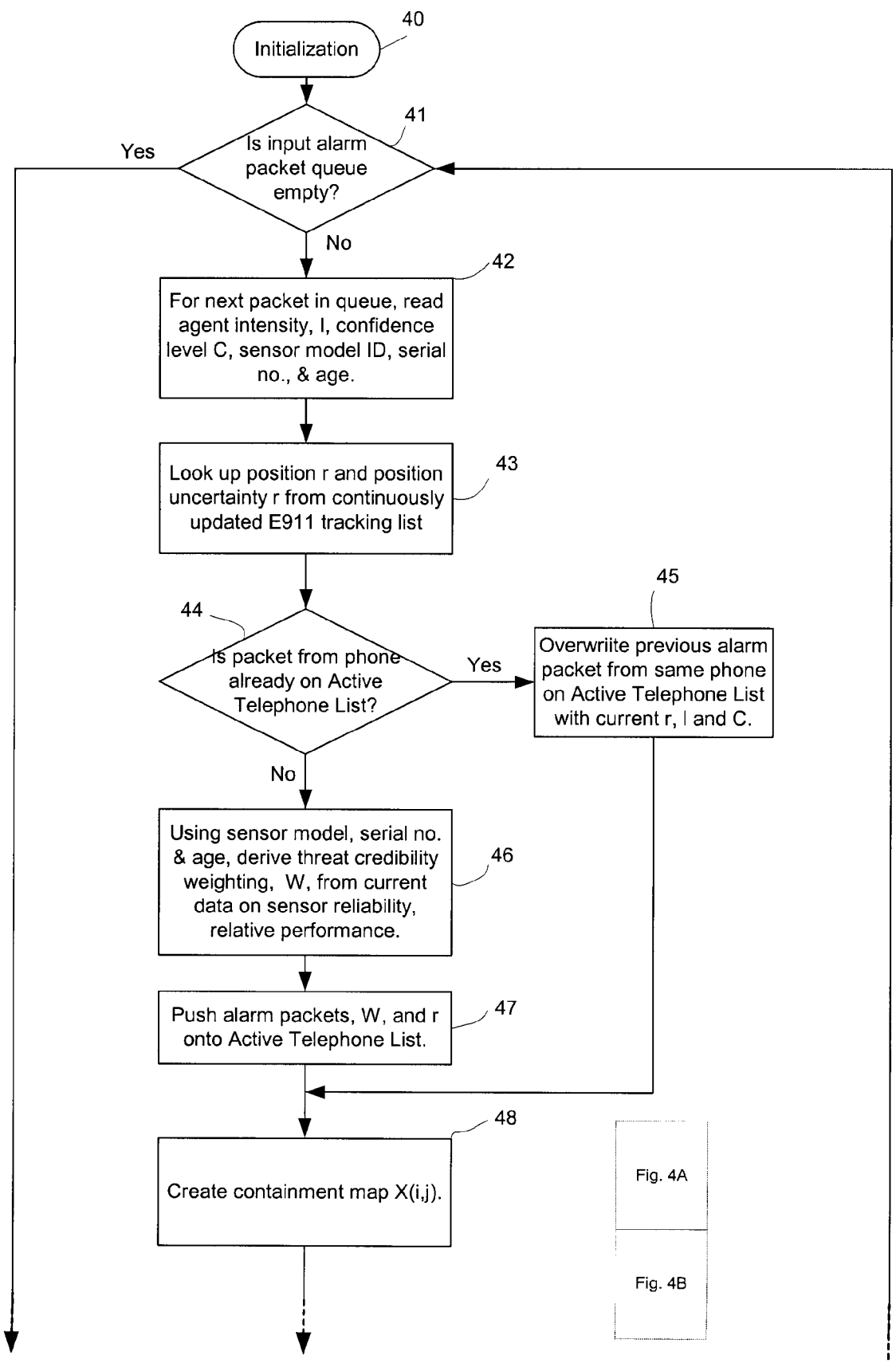
FIGS. 4A and 4B are flow charts of computer operations in alarm mode, according to one embodiment of the present invention.
Figure 4B:
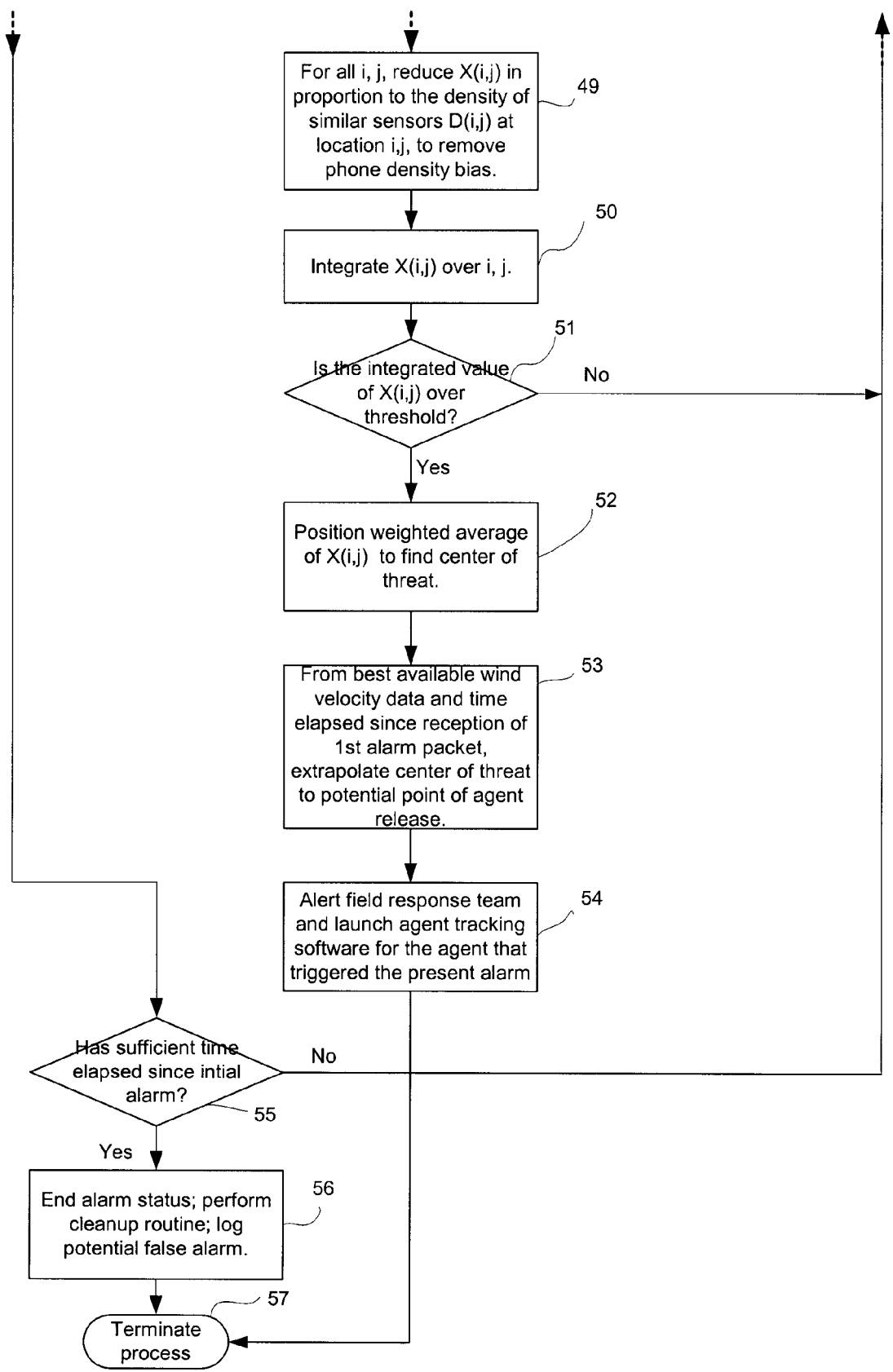

The flow chart of FIG. 3 illustrates how the computer 15 initially handles the alarm packets broadcast from the telephone 10 and base station 12. FIGS. 4A and 4B chart the flow of operation of the computer 15 to determine the existence of an alarm condition, among other things.

The flow chart in FIG. 3 begins with initialization step 30. In following step 31, the computer 15 reads the received alarm packets from the telephone 10 and base station 12 to determine the particular agent detected and the vicinity of the telephone from the identification of the telephone cell network base station 12 in communication with the telephone in alarm. Vicinity refers to the area enclosing the cell of the base station 12 and the cells immediately surrounding that cell. As used in the present invention, vicinities, each centered about a base station 10, overlap with adjacent vicinities to avoid voids in mapping and to facilitate the tracking of hazardous agents.

The computer determines whether a telephone has already detected that particular agent in the vicinity of the telephone cell base station 12, by step 32. If so, step 36 is engaged by which the alarm packets are placed into an Input Alarm Packet Queue for the particular agent and vicinity for processing by an active Alarm Mode routine, described below. The process then returns to the initialization step 30 to start the process over again.

If not, i.e., the agent alarm in that vicinity is new, the process moves to step 33 in which the E911 tracking routine is engaged to determine the locations, r, and the uncertainty in locations, Δr, of all telephones which are capable of detecting that agent type in that vicinity. A density map D(i,j) of those telephones in the vicinity is created and maintained in next step 34. The indices i,j refer to a discretized area block, each of which forms a constituent of the vicinity; m is an index to all the telephones being tracked, i.e., the telephones in the area block i,j with sensors capable of detecting the particular agent. Each area block i,j has an area $\Delta z^2$, the smallest area of resolution, and the sum of the areas of all the area blocks in a vicinity should equal the area of the vicinity.

The density value D(i,j) is calculated by iteration for the area block i,j over m. For all telephones m of the area block i,j, if the block i,j falls in a circle of uncertainty radius |Δr(m)| centered at r(m), then $$D(i,j)=D(i,j)+(\Delta z^2)/(\pi|\Delta r(m)|^2).$$

The greater the uncertainty in the location of telephone m, the smaller its presence in the area block i,j is presumed to be. If the location r of telephone m is in area block i,j and it is certain that that telephone is in that area block, i.e., the uncertainty in location Δr is such that area of uncertainty $\pi \Delta r^2$ is a minimum, or equal to $\Delta z^2$, the density D(i,j) is incremented by one. Integrating D(i,j) over a vicinity yields the number of telephones in the vicinity.

Then by step 35 the Alarm Mode routine described below is launched for the alarming agent and vicinity and the process returns to the initialization step 30 to start over again.

The Alarm Mode routine of FIGS. 4A and 4B locates the center location of a detected agent and its likely point of origin. After initialization step 40, the computer 15 by decision step 41 checks the status of the Input Alarm Packet Queue which is loaded by the FIG. 3 process. Each Input Alarm Packet Queue is particular to an agent and vicinity, the cell area enclosing the base station 10 and cell areas immediately surrounding that base station, as described previously. If there is no alarm packet in the queue, the process moves to step 55 which determines whether a sufficient amount of time has elapsed since the initial reception of previous alarm packets, i.e., packets for that agent and vicinity. If a sufficient amount of time has passed, the alarm status is ended, a potential false alarm is logged, a cleanup is performed by step 56 and this process is terminated by step 57. It is assumed that the computer 15 runs a multitasking operating system in which processes are initiated and terminated as needed. This allows the possibility of simultaneous incidents in multiple vicinities to be handled by the computer 15 running several processes of the Alarm Mode routine concurrently.

Returning to the decision step 55 in the process at hand, step 41 is reached if a sufficient amount of time has not passed. If by the decision step 41, there is an alarm packet determined to be in the queue, the alarm packets are read by next step 42 to determine the agent intensity I, confidence level C, sensor model identification, the sensor's serial number and its age. In step 43, the position r of the telephone which sent the alarm packet and the telephone's position uncertainty Δr is determined from the E911 tracking list. Then by step 44 a decision is made whether the current packets are from a telephone which is already on an Active Telephone List. If not, then a threat credibility weighting factor W is determined by step 46 from the alarm packet data on the sensor model, its serial number, age, and current data on the reliability of that sensor, its relative performance, and the effects of aging upon that sensor model. Note that more current data can be uploaded into the computers 15 as more information on the telephone sensors becomes available. Step 47 then pushes the alarm packet data, threat credibility weighting factor W and the telephone location r onto the Active Telephone List and a contamination map is created by step 48.

For each area block i,j and particular alarming agent, a contamination value X(i,j) is created from the agent intensity I, confidence level C, threat credibility weighting factor W and the uncertainty Δr in the location of each telephone. X(i,j) is calculated iteratively for all the telephones in the Active Telephone List indexed by k, with the equation:

$$X(i,j)=X(i,j)+I(k)*C(k)*W(k)*F(k)$$

where F(k) is a factor $\sim 1/\pi|\Delta r(k)|^2$. Note that the contamination value increases with increasing agent intensity, confidence and credibility, and decreases with the uncertainty in telephone location, as might be expected.

Returning to the decision step 44, if the alarm packet under consideration is from a telephone which is already on the Active Telephone List, then the process branches to step 45 by which the Active Telephone List is updated with current alarm packet information. The previous location r, agent intensity I, confidence level C data from the telephone are overwritten by the present data of the telephone under consideration. Then the process moves to step 48 where the contamination map with contamination values X(i,j) are calculated, as explained previously.

Step 49 follows step 48. For all area blocks i,j, the contamination values X(i,j) are reduced in proportion to the density of similar sensors D(i,j) in each area block i,j so as to remove any skew due to variations in the density of cellular telephones. For example, three telephones in alarm in an area with only three telephones should weigh more heavily than an area with 20 telephones and only three in alarm. Then step 50 integrates the contamination values X(i,j) over all constituent area blocks i,j in the vicinity, i.e., the area of the cell covered by the cell base station and surrounding cell areas. It should be noted again that the cell telephones 10 in alarm whose cell base stations 12 are surrounded by different cell base stations 12 are tracked by separate processes of the Alarm Mode routine and separate containment maps are created.

Returning to the present process, the result is compared with a predetermined threshold value T by decision step 51. If the threshold value T is exceeded, a weighted averaging of X(i,j) is calculated in step 52 to find the likely center location of the detected hazardous agent. That is, $$r(\text{center}) = \sum_{i,j} \frac{X(i,j)*r(i,j)}{X(i,j)}$$

In step 53 the center location of hazardous agent is extrapolated to the probable origin, such as a point of deliberate release, of the hazardous agent from the best available wind velocity data and the elapsed time since the reception of the first alarm packet. Then an alert is issued in step 54 to any organization or team assigned to respond to the detected hazardous agent. Software which tracks the hazardous agent is also launched. Then the process is terminated by step 57. Again, it should be noted that the cell phones 10 continue to broadcast alarm packets and the alarm processing routine described with respect to FIG. 3 continues to the packets onto the Alarm Packet Queues. These later packets are handled by a separate agent tracking routine (not presently detailed) launched in step 54.

Returning to the decision step 51, if the threshold value T is not exceeded, the process returns to step 41.

Thus the present invention offers an inexpensive, easily installed, low-maintenance network system for is On the other hand, the present invention provides for a network system which is inexpensive to operate with easy installation and low maintenance costs for the detection and location of hazardous agents which have been loosened onto the public, intentionally or not.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A cellular telephone network-based system for detecting hazardous agents, said cellular telephone network capable of locating cellular telephones in said network, said system comprising
   a plurality of cellular telephones in public circulation, each cellular telephone having at least one detector for detecting at least one hazardous agent, said cellular telephone broadcasting over said cellular telephone network at least one alarm packet upon detecting said hazardous agent; and
   at least one computer interconnected with said plurality of telephones by said cellular telephone network for processing said alarm packet and setting an alarm condition for said hazardous agent in a vicinity of said cellular telephone configured to calculate based upon alarm packets from other telephones with detectors for said hazardous agent in said vicinity, said calculations including determination of a level of contamination of said hazardous agent in said vicinity and integration of said level of contamination of said hazardous agent over said vicinity, with bias due to variations in cellular telephone density over said vicinity removed, to determine whether a result of integration exceeds an alarm threshold.

2. The system of claim 1 wherein said calculations include determination of a level of contamination of said hazardous agent in said vicinity and integration over said level of contamination of said hazardous agent over said vicinity to determine whether a result of integration exceeds an alarm threshold.

3. The system of claim 1 wherein said calculations include adjusting for the age of said at least one detector of said cellular telephone in alarm.

4. The system of claim 1 wherein said calculations include adjusting for the reliability of said at least one detector of said cellular telephone in alarm.

5. The system of claim 1 wherein said computer further creates a map of area contaminated by said hazardous agent.

6. The system of claim 5 wherein said computer further determines a likely origin of said hazardous agent.

7. The system of claim 6 wherein said computer determines said likely origin of said hazardous agent from wind velocity data.

8. The system of claim 7 wherein said computer further predicts spread of said hazardous agent from said wind velocity data.

9. The system of claim 1 wherein said hazardous agent comprises biological, chemical or radioactive material.

10. The system of claim 1 wherein said calculations include compensating for any uncertainty in telephone locations.

11. In a system based on a cellular telephone network having a plurality of cellular telephones in public circulation, each cellular telephone capable of detecting one or more hazardous agents and being located by said cellular telephone network, a method comprising
    receiving an alarm packet from any of said cellular telephones in public circulation responsive to detection of a hazardous agent, parsing said alarm packets to remove identifying data of said hazardous agent and a cellular telephone base station in communication with said telephone;
    determining a level of contamination of said hazardous agent in said vicinity from alarm packets from other telephones in said vicinity based on said identifying data;
    mathematically integrating said level of contamination over said vicinity, including eliminating bias due to variations in cellular telephone density over said vicinity; and
    determining whether a resulting integration value exceeds a threshold to determine whether an alarm condition for said hazardous agent in said vicinity exists.

12. The method of claim 11 wherein said contamination level determining step includes accounting for the age of a detector in a cellular telephone in alarm.

13. The method of claim 11 wherein said contamination level determining step includes accounting for the reliability of a detector in a cellular telephone in alarm from reliability data.

14. The method of claim 11 further comprising creating a map of area contaminated by said hazardous agent.

15. The method of claim 11 further comprising determining a likely origin of said hazardous agent.

16. The method of claim 15 wherein said likely origin determining step includes using wind velocity data.

17. The method of claim 16 further comprising predicting spread of said hazardous agent from said wind velocity data.

18. The method of claim 11 wherein said hazardous agent comprises biological, chemical or radioactive material.

19. The method of claim 11 wherein said contamination level determining step includes compensating for any uncertainty in telephone locations.

* * * * *